United States Patent
Okazaki et al.

(10) Patent No.: US 7,957,834 B2
(45) Date of Patent: Jun. 7, 2011

(54) METHOD FOR CALCULATING ROTATION CENTER POINT AND AXIS OF ROTATION, METHOD FOR GENERATING PROGRAM, METHOD FOR MOVING MANIPULATOR AND POSITIONING DEVICE, AND ROBOTIC SYSTEM

(75) Inventors: Yoshiyuki Okazaki, Shiga (JP); Masaya Hirayama, Osaka (JP)

(73) Assignee: Panasonic Corporation, Osaka (JP)

( * ) Notice: Subject to any disclaimer, the term of this patent is extended or adjusted under 35 U.S.C. 154(b) by 562 days.

(21) Appl. No.: 11/791,452

(22) PCT Filed: Jan. 17, 2007

(86) PCT No.: PCT/JP2007/050579
§ 371 (c)(1),
(2), (4) Date: May 24, 2007

(87) PCT Pub. No.: WO2007/138756
PCT Pub. Date: Dec. 6, 2007

(65) Prior Publication Data
US 2009/0228144 A1   Sep. 10, 2009

(30) Foreign Application Priority Data
May 31, 2006   (JP) ................................ 2006-151233

(51) Int. Cl.
*G06F 19/00* (2011.01)
*B25J 9/10* (2006.01)
*G01B 21/24* (2006.01)
*B25J 13/08* (2006.01)

(52) U.S. Cl. .......... 700/245; 700/58; 700/109; 700/254; 700/259

(58) Field of Classification Search ............... 66/185, 66/169, 520, 636; 700/109, 245, 254, 259, 700/58; 33/504, 556; 318/568.11, 568.13, 568.17, 568.21, 572, 652; 409/12, 51; 501/33; 901/9; 702/105
See application file for complete search history.

(56) References Cited

U.S. PATENT DOCUMENTS
4,196,523 A * 4/1980 Nagata et al. .................... 33/504
(Continued)

FOREIGN PATENT DOCUMENTS
EP   1 619 567   1/2006
(Continued)

OTHER PUBLICATIONS

Supplementary European Search Report issued Dec. 7, 2009 in Application No. EP 07 71 3626.

*Primary Examiner* — Khoi Tran
*Assistant Examiner* — Dale Moyer
(74) *Attorney, Agent, or Firm* — Wenderoth, Lind & Ponack, L.L.P.

(57) ABSTRACT

Calculating a rotation center point on a plane of rotation of a positioning device by using a manipulator. The positioning device positions a workpiece by rotating the plane of rotation. The calculating includes a first step of obtaining location information of a predetermined position on the plane of rotation, a second step of rotating the plane of rotation of the positioning device 180 degrees, a third step of obtaining location information of the predetermined position on the 180-degree rotated plane of rotation, and a fourth step of calculating a point bisecting a straight line as the rotation center point of the plane of rotation of the positioning device from the location information obtained in the first step and the location information obtained in the third step, the straight line connecting the predetermined position of the first step and the predetermined position of the third step.

9 Claims, 7 Drawing Sheets

U.S. PATENT DOCUMENTS

| | | | | |
|---|---|---|---|---|
| 4,542,467 | A * | 9/1985 | McMurtry | 700/195 |
| 4,598,380 | A * | 7/1986 | Holmes et al. | 700/251 |
| 4,636,960 | A * | 1/1987 | McMurtry | 700/193 |
| 5,095,788 | A * | 3/1992 | Matoni | 82/118 |
| 5,297,238 | A * | 3/1994 | Wang et al. | 700/259 |
| 5,309,646 | A * | 5/1994 | Randolph et al. | 33/502 |
| 5,329,457 | A * | 7/1994 | Hemmerle et al. | 700/193 |
| 5,357,450 | A * | 10/1994 | Hemmerle et al. | 700/176 |
| 5,373,222 | A * | 12/1994 | Hemmerle et al. | 318/652 |
| 5,910,719 | A | 6/1999 | Thorne | |
| 6,243,621 | B1 | 6/2001 | Tao et al. | |
| 2001/0041129 | A1 * | 11/2001 | Tsuneda et al. | 414/744.1 |
| 2002/0048505 | A1 * | 4/2002 | Tsuneda et al. | 414/744.1 |
| 2003/0167103 | A1 * | 9/2003 | Tang et al. | 700/254 |
| 2003/0200042 | A1 * | 10/2003 | Gan et al. | 702/105 |
| 2006/0025890 | A1 | 2/2006 | Nagatsuka et al. | |

FOREIGN PATENT DOCUMENTS

| | | |
|---|---|---|
| JP | 63-89279 | 4/1988 |
| JP | 06-278063 | 10/1994 |
| JP | 06-301411 | 10/1994 |
| JP | 6-301411 | 10/1994 |
| JP | 08-129408 | 5/1996 |
| JP | 8-137528 | 5/1996 |
| JP | 08-137528 | 5/1996 |
| JP | 9-034523 | 2/1997 |
| JP | 2000-20120 | 1/2000 |
| JP | 2000-020120 | 1/2000 |
| JP | 2001-125623 | 5/2001 |
| JP | 2002-303592 | 10/2002 |
| JP | 2005-019963 | 1/2005 |
| JP | 2005-313254 | 11/2005 |
| JP | 2006-48244 | 2/2006 |

* cited by examiner

METHOD FOR CALCULATING ROTATION CENTER POINT AND AXIS OF ROTATION, METHOD FOR GENERATING PROGRAM, METHOD FOR MOVING MANIPULATOR AND POSITIONING DEVICE, AND ROBOTIC SYSTEM

BACKGROUND OF THE INVENTION

1. Field of Invention

The present invention relates to a method for calculating at least one of the rotation center point of a rotor and the axis of rotation connecting between the rotation center points of two rotors by using a manipulator. The invention also relates to a method for generating a program, a method for moving a manipulator and a positioning device, and a robotic system.

2. Description of the Related Art

A well-known conventional method for calculating the rotation center point of a rotor is carried out as follows. A mark is made on a predetermined position of the rotor and photographed before the rotor is rotated 180 degrees, and after the 180 degree rotation, the mark is photographed again. The two locations of the mark are connected by a line and the center of the line is determined to be the center of the rotor (refer to, for example, Patent Documents 1 and 2 below).

This conventional art, however, requires an external photographic device to photograph the mark on the rotor before and after the rotor is rotated, thereby complicating the system.

Furthermore, there has not been suggested any method for calculating a rotation center point or an axis of rotation connecting the rotation center points of two rotors by using a manipulator.

Patent Document 1: Japanese Patent Unexamined Publication No. 2002-303592
Patent Document 2: Japanese Patent Unexamined Publication No. 2005-019963

BRIEF SUMMARY OF THE INVENTION

The present invention is directed to provide a method for calculating the rotation center point of a rotor and the axis of rotation connecting the rotation center points of two rotors without using an external device such as a photographic device.

The method for calculating a rotation center point according to the present invention is a method for calculating a rotation center point on a plane of rotation of a positioning device by using a manipulator (specifically, using a top position of a tool attached to the manipulator), the positioning device positioning a workpiece by rotating the plane of rotation. This method includes: a first step of obtaining location information of a predetermined position on the plane of rotation by using the manipulator; a second step of rotating the plane of rotation of the positioning device 180 degrees; a third step of obtaining location information of the predetermined position on the 180-degree rotated plane of rotation by using the manipulator; and a fourth step of calculating a point bisecting a straight line as the rotation center point of the plane of rotation of the positioning device from the location information obtained in the first step and the location information obtained in the third step, the straight line connecting the predetermined position of the first step and the predetermined position of the third step.

This method enables the calculation of the rotation center point of a plane of rotation by using a manipulator and a positioning device used in the actual system. As a result, the rotation center point of the rotor can be calculated without using a photographic device or other external device.

The method for calculating an axis of rotation according to the present invention is a method for calculating an axis of rotation connecting between a rotation center point on a first plane of rotation of a positioning device and a rotation center point on a second plane of rotation of the positioning device by using a manipulator, the positioning device positioning a workpiece by rotating the first plane of rotation and the second plane of rotation which are disposed opposite to each other. This method includes: a first step of obtaining location information of a first measuring point on the first plane of rotation by using the manipulator; a second step of rotating the first plane of rotation of the positioning device 180 degrees; a third step of obtaining location information of the first measuring point on the 180-degree rotated first plane of rotation by using the manipulator; a fourth step of calculating a point bisecting a straight line as the rotation center point of the first plane of rotation from the location information obtained in the first step and the location information obtained in the third step, the straight line connecting the first measuring point of the first step and the first measuring point of the third step; a fifth step of obtaining location information of a second measuring point on the second plane of rotation by using the manipulator; a sixth step of rotating the second plane of rotation 180 degrees; a seventh step of obtaining location information of the second measuring point on the 180-degree rotated second plane of rotation by using the manipulator; an eighth step of calculating a point bisecting a straight line as the rotation center point of the second plane of rotation from the location information obtained in the fifth step and the location information obtained in the seventh step, the straight line connecting the second measuring point of the fifth step and the second measuring point of the seventh step; and a ninth step of calculating an axis of rotation connecting the rotation center point of the first plane of rotation and the rotation center point of the second plane of rotation.

This method enables the calculation of the axis of rotation connecting the rotation center point on a first plane of rotation and the rotation center point on a second plane of rotation of a positioning device without using an external device by using a manipulator and a positioning device used in the actual system. The positioning device positions a workpiece by rotating the first plane of rotation and the second plane of rotation which are disposed opposite to each other.

Furthermore, the positioning device having two planes of rotation opposite to each other can calculate the axis of rotation with higher precision by measuring the two planes of rotation than the axis of rotation calculated by measuring only one plane of rotation.

The method for generating a program according to the present invention is a method for generating a program for moving at least one of a manipulator and a positioning device, the positioning device positioning a workpiece by rotating a plane of rotation thereof. This method includes: a first step of comparing location information indicating a rotation center point of the plane of rotation of the positioning device contained in the program with location information of the rotation center point of the plane of rotation of the positioning device calculated according to the method for calculating a rotation center point of the present invention; and a second step of generating a new operating program by correcting the program based on a comparison result in the first step.

This method enables the generation of an operating program capable of moving the manipulator accurately because the location information of the rotation center point contained in the program can be corrected by the location information of the rotation center point calculated by the method for calculating a rotation center point according to the present invention.

The method for moving a manipulator and a positioning device according to the present invention is a method for moving at least one of a manipulator and a positioning device, the positioning device positioning a workpiece by rotating a plane of rotation thereof. This method includes: a step of moving at least one of the manipulator and the positioning device, based on the operating program generated according to the method for generating a program of the present invention.

This method enables at least one of the manipulator and the positioning device to be moved accurately by using an operating program in which the location information of the rotation center point contained in the program is corrected by the location information of the rotation center point calculated by the method for calculating a rotation center point according to the present invention.

The robotic system according to the present invention is a robotic system for calculating a rotation center point on a plane of rotation of a positioning device, the positioning device positioning a workpiece by rotating the plane of rotation. This robotic system includes: a manipulator; a motion controller for obtaining first location information of a predetermined position on the plane of rotation by using the manipulator, rotating the plane of rotation 180 degrees, and obtaining second location information of the predetermined position on the 180-degree rotated plane of rotation by using the manipulator; and a rotation center point calculator for calculating a position bisecting a straight line as the rotation center point of the plane of rotation by using the first location information and the second location information obtained by the motion controller, the straight line connecting the predetermined position prior to the rotation of the plane of rotation and the predetermined position after the rotation of the plane of rotation.

This structure enable the calculation of the rotation center point of a rotor without using an external device such as a photographic device because the rotation center point of a plane of rotation can be calculated by using a manipulator and a positioning device used in the actual system.

The robotic system according to the present invention is a robotic system for calculating an axis of rotation connecting a rotation center point on a first plane of rotation of a positioning device and a rotation center point on a second plane of rotation of the positioning device, the positioning device positioning a workpiece by rotating the first plane of rotation and the second plane of rotation which are disposed opposite to each other. This robotic system includes: a manipulator; a motion controller for (i) obtaining first location information of a first measuring point on the first plane of rotation by using the manipulator, (ii) rotating the first plane of rotation 180 degrees, (iii) obtaining second location information of the first measuring point of the rotated first plane of rotation by using the manipulator, (iv) obtaining third location information of a second measuring point on the second plane of rotation by using the manipulator, (v) rotating the second plane of rotation 180 degrees, and (vi) obtaining fourth location information of the second measuring point of the rotated second plane of rotation by using the manipulator; and an axis-of-rotation calculator for calculating (i) a point bisecting a straight line as the rotation center point of the first plane of rotation by using the first location information and the second location information obtained by the motion controller, the straight line connecting the first measuring point prior to the rotation of the first plane of rotation and the first measuring point after the rotation of the first plane of rotation, (ii) a point bisecting a straight line as the rotation center point of the second plane of rotation by using the third location information and the fourth location information obtained by the motion controller, the straight line connecting the second measuring point prior to the rotation of the second plane of rotation and the second measuring point after the rotation of the second plane of rotation, and (iii) an axis of rotation connecting the rotation center point of the first plane of rotation and the rotation center point of the second plane of rotation.

This structure enables the calculation of the axis of rotation of a rotor without using an external device such as a photographic device. This structure is achieved by using a manipulator and a positioning device used in the actual system when calculating the axis of rotation connecting the rotation center point on a first plane of rotation and the rotation center point on a second plane of rotation of the positioning device positioning a workpiece by rotating the first and the second plane of rotation disposed opposite to each other.

Furthermore, the positioning device having two planes of rotation opposite to each other can calculate the axis of rotation with higher precision by measuring the two planes of rotation than the axis of rotation calculated by measuring only one plane of rotation.

The robotic system may further include a simulation calculator, the simulation calculator performing at least one of simulation calculation and off-line teaching by using the position coordinate of the rotation center point of the plane of rotation of the positioning device, the position coordinate having been calculated by the rotation center point calculator.

This structure enables the robotic system to perform simulation calculation and off-line teaching with high precision by using the position coordinate of the rotation center point calculated by the rotation center point calculator.

The robotic system may include a robot controller having the motion controller and simulation equipment having the simulation calculator.

This structure enables the robot controller and the simulation equipment to be independent of each other so as to achieve a practical structure.

The robot controller may include the rotation center point calculator.

This structure enables the rotation center point to be calculated by the robot controller, so that at least one of simulation calculation and off-line teaching can be performed with high precision while improving the versatility of the simulation equipment.

The simulation equipment may include the rotation center point calculator.

This structure enables the rotation center point to be calculated by the simulation equipment, so that at least one of simulation calculation and off-line teaching can be performed with high precision even when the robot controller does not have the function for calculation.

As described hereinbefore, the present invention provides a method for calculating the rotation center point of a rotor and the axis of rotation connecting the rotation center points of two rotors without using an external device such as a photographic device.

DETAILED DESCRIPTION OF THE INVENTION

Embodiments of the present invention are described as follows with reference to drawings. Note that the present invention is not limited to these embodiments.

First Embodiment

Figure 1:
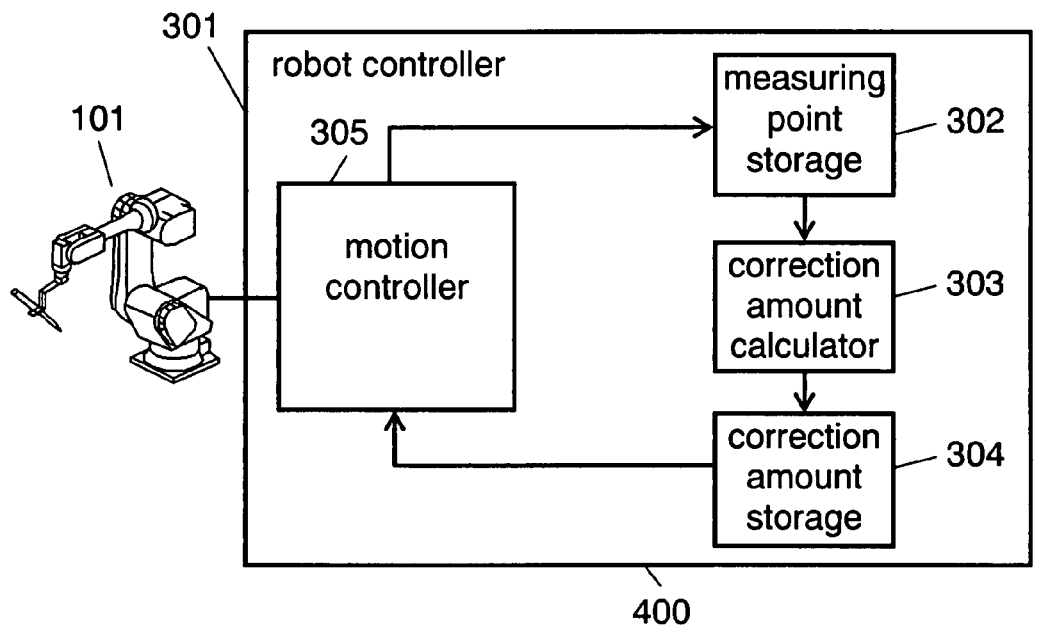
FIG. 1 shows a structure of a robotic system according to a first embodiment of the present invention.
Figure 2:
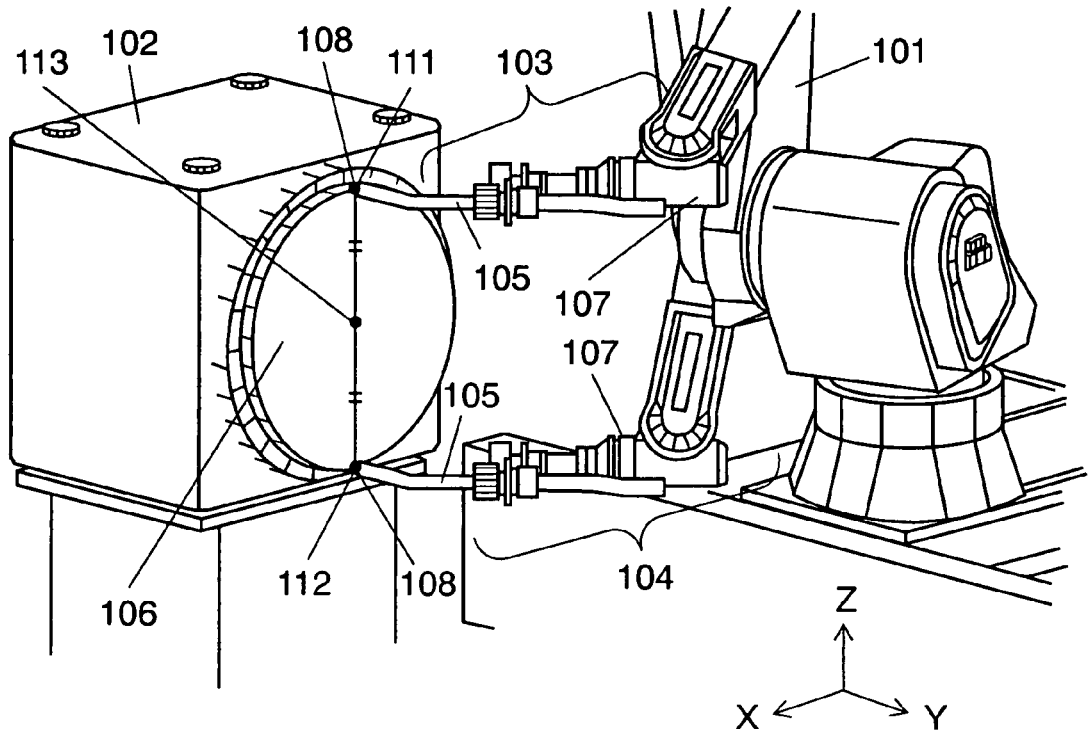
FIG. 2 is a schematic diagram showing a method for calculating the rotation center point of the plane of rotation of a rotary positioner, which is an example of a positioning device according to the first embodiment of the present invention.

A first embodiment of the present invention is described as follows with reference to FIGS. 1 and 2. FIG. 1 shows a structure of robotic system 400 according to the first embodiment. FIG. 2 is a schematic diagram showing a method for calculating the rotation center point of the plane of rotation of a rotary positioner, which is an example of a positioning device according to the first embodiment.

As shown in FIG. 1, robotic system 400 includes manipulator 101 and robot controller 301, which controls manipulator 101.

Robot controller 301 includes measuring point storage 302, correction amount calculator 303, correction amount storage 304, and motion controller 305. Measuring point storage 302 stores the location information of a measuring point measured by moving manipulator 101. Correction amount calculator 303 calculates the amount of correction of an operating program based on the location information stored in measuring point storage 302. Correction amount storage 304 stores the amount of correction calculated by correction amount calculator 303. Motion controller 305, which has the operating program to control the motion of manipulator 101, measures the location information by moving manipulator 101. Motion controller 305 controls not only the motion of manipulator 101 but also the rotation of rotary positioner 102.

As shown in FIG. 2, manipulator 101 moves its arm 107 while holding tool 105 by a hand, as an end effector or the like, so as to process a workpiece.

Rotary positioner 102 is a positioning device for rotating plane of rotation 106, thereby positioning the workpiece to be processed by manipulator 101 (in FIG. 2, Y axis represents the axis of rotation of plane of rotation 106, and plane of rotation 106 is located in the direction of X-Z plane).

In the present embodiment, manipulator 101 is also used to measure the location of rotation center point 113 of plane of rotation 106 of rotary positioner 102.

Manipulator 101 actually needs to have only one arm 107. However, two arms 107 are illustrated in FIG. 2 in order to show the two postures (described later) necessary to measure the location of rotation center point 113 using manipulator 101.

Similarly, only one mark 108 is actually needed on a predetermined position on plane of rotation 106 of rotary positioner 102. However, two marks 108 are illustrated in FIG. 2 in order to clarify the states before and after plane of rotation 106 is rotated 180 degrees.

Figure 3:
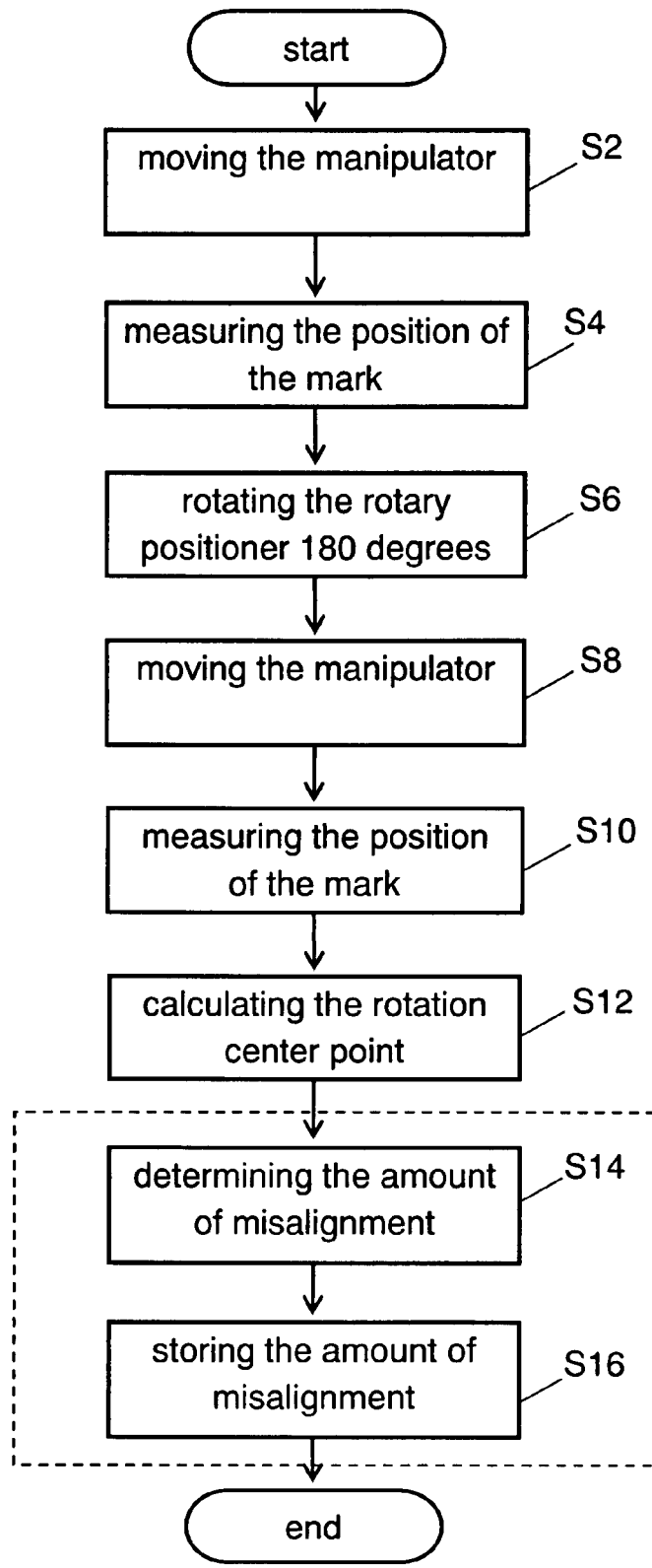
FIG. 3 is a flowchart showing the steps of calculating the rotation center point of the plane of rotation of the rotary positioner by using a robotic system according to the first embodiment of the present invention.

The following is a description of the operation for calculating rotation center point 113 of plane of rotation 106 of rotary positioner 102 in robotic system 400. FIG. 3 is a flowchart showing the steps of calculating the rotation center point of plane of rotation 106 of rotary positioner 102 by using robotic system 400 according to the first embodiment.

As shown in FIG. 3, plane of rotation 106 of rotary positioner 102 as the target to be measured is set at an arbitrary rotation angle first, and then the tip (end portion) of tool 105 attached to manipulator 101 is moved to reach mark 108 made in an arbitrary position (other than the rotation center point) on plane of rotation 106 of rotary positioner 102 (S2). The tip of tool 105 can be brought into contact with mark 108 to measure the location information of mark 108 more accurately.

The posture of manipulator 101 in Step S2 corresponds to first measuring posture 103 shown in FIG. 2. In this posture, tip position 111 of tool 105 attached to manipulator 101 is on mark 108. Motion controller 305 of robot controller 301 measures the position coordinate of mark 108 (the first location information, which is more specifically the position coordinate of tip position 111 of tool 105) and stores it to measuring point storage 302 (S4).

Mark 108 can be provided, for example, by scribing or punching plane of rotation 106, or by being marked on plane of rotation 106.

Next, plane of rotation 106 of rotary positioner 102, which is the target to be measured is rotated 180 degrees (S6).

Motion controller 305 controls manipulator 101 to move the tip of tool 105 to the location where mark 108 is placed after the rotation (S8).

The posture of manipulator 101 in Step S8 corresponds to second measuring posture 104 shown in FIG. 2. In this posture, tip position 112 of tool 105 attached to manipulator 101 is on mark 108. Motion controller 305 of robot controller 301 measures the position coordinate of mark 108 (the second location information, which is more specifically the position coordinate of tip position 112 of tool 105) and stores it to measuring point storage 302 (S10).

Then, correction amount calculator 303 in robot controller 301 works as a rotation center point calculator so as to calculate rotation center point 113 of plane of rotation 106 as follows.

Correction amount calculator 303 calculates a point bisecting the following straight line as rotation center point 113 of plane of rotation 106 of rotary positioner 102. The straight line connects the position coordinate of tip position 111 of tool 105 that has been measured and stored in measuring point storage 302 in Step S4 and the position coordinate of tip position 112 of tool 105 that has been measured and stored in measuring point storage 302 in Step S10 (S12). Correction amount calculator 303 then stores the location information of rotation center point 113 to correction amount storage 304.

As described hereinbefore, the method for calculating a rotation center point according to the present embodiment does not need a detection device such as a photographing means in order to calculate rotation center point 113 of plane of rotation 106 of rotary positioner 102.

In the case where it is necessary to correct the operation of robotic system 400, as shown by the dotted-line square in FIG. 3, correction amount calculator 303 determines the amount of misalignment between rotation center point 113 of plane of rotation 106 of rotary positioner 102, which has been measured as above and the rotation center point of plane of rotation 106 of rotary positioner 102, which has been previously provided to robot controller 301 (S14). Correction amount calculator 303 then stores the amount of misalignment to correction amount storage 304 (S16). Motion controller 305 uses the amount of misalignment stored in correction amount storage 304 to correct the motion of manipulator 101. The correction like this enables robotic system 400 to control manipulator 101 with higher precision.

The information related to the rotation center point of rotary positioner 102 previously provided to robot controller 301 can be, for example, the location information of the rotation center point of plane of rotation 106 of rotary positioner 102 in a control program, which is stored in motion controller 305 of robot controller 301 in order to control manipulator 101 and the like.

The present embodiment has described an example in which the rotation center point of plane of rotation 106 is calculated by using mark 108. Alternatively, instead of using mark 108, it is possible to use as the target to be measured an arbitrary point on a jig or the like that is attached to and rotates together with plane of rotation 106 of rotary positioner 102. The coordinate of the arbitrary point is measured before and after plane of rotation 106 is rotated so as to determine the coordinate of the rotation center point of plane of rotation 106.

In the example of the present embodiment, manipulator 101 has a single arm 107 and plane of rotation 106 has a single mark 108 thereon. However, the present invention is not limited to this example. It is alternatively possible that manipulator 101 has a plurality of arms 107, and the location of mark 108 before and after the rotation of plane of rotation 106 is measured by these arms 107. It is also possible that plane of rotation 106 has a plurality of marks 108 thereon, and the coordinate of the rotation center point is calculated from the coordinates of these marks so as to improve the precision of calculating the rotation center point.

Second Embodiment

Figure 4:
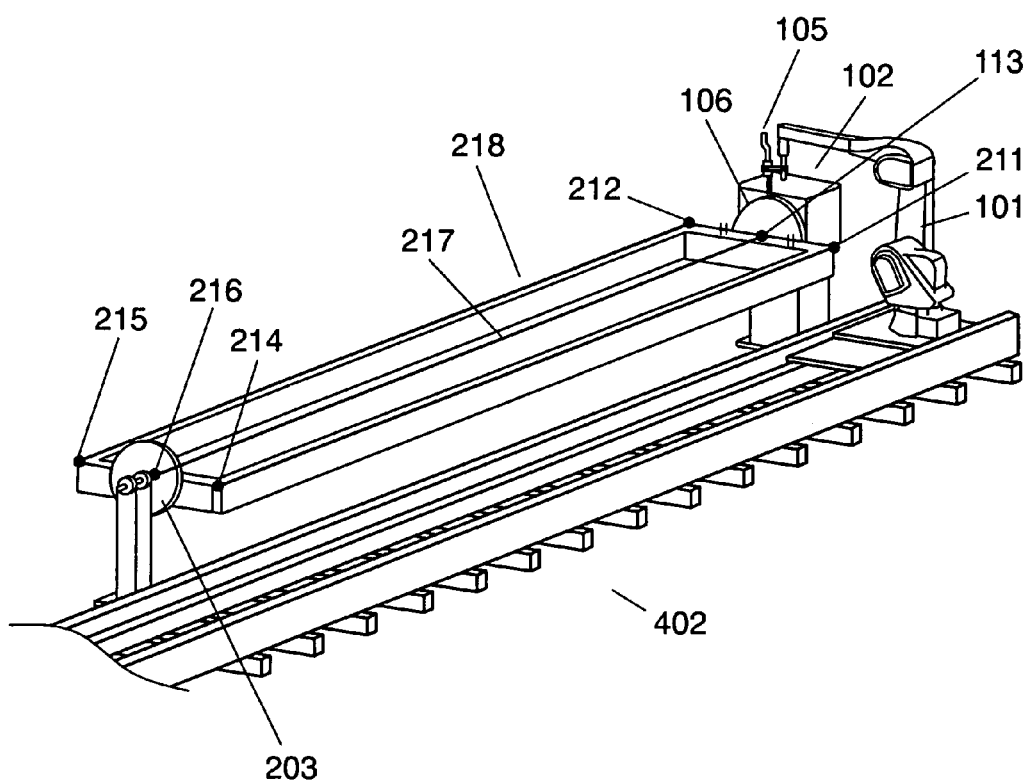
FIG. 4 is a schematic diagram showing a method for calculating an axis of rotation connecting the rotation center points of two opposite planes of rotation according to a second embodiment of the present invention.

A second embodiment of the present invention is described as follows with reference to FIGS. 1 and 4. FIG. 4 is a schematic diagram showing a method for calculating an axis of rotation connecting the rotation center points of two opposite planes of rotation according to the second embodiment.

In the present embodiment, the same components as those in the first embodiment will be referred to with the same numerals as those in the first embodiment and not described in detail again. Similar to robotic system 400 of the first embodiment, robotic system 402 includes robot controller 301 which controls manipulator 101.

Robotic system 402 of the present embodiment can calculate rotation center points 113 and 216 of two opposite planes of rotation 106 and 203 which hold a workpiece together. Robotic system 402 can also calculate axis of rotation 217 connecting rotation center points 113 and 216.

In FIG. 4, manipulator 101 is used to measure the rotation center point of plane of rotation 106 of rotary positioner 102. Rotary positioner 102 is a positioning device used by placing a workpiece thereon and rotating it. Manipulator 101 measures rotation center point 113 of plane of rotation 106.

Plane of rotation 203 is disposed rotatably in a position facing plane of rotation 106 of rotary positioner 102. Planes of rotation 106 and 203 have the same axial rotation, and plane of rotation 203 is rotated by the rotation of plane of rotation 106.

Planes of rotation 106 and 203 have frame-like jig 218 attached therebetween in order to place a workpiece or the like thereon. Jig 218 is supported by planes of rotation 106 and 203 and rotated by the rotation of rotary positioner 102.

Figure 5:
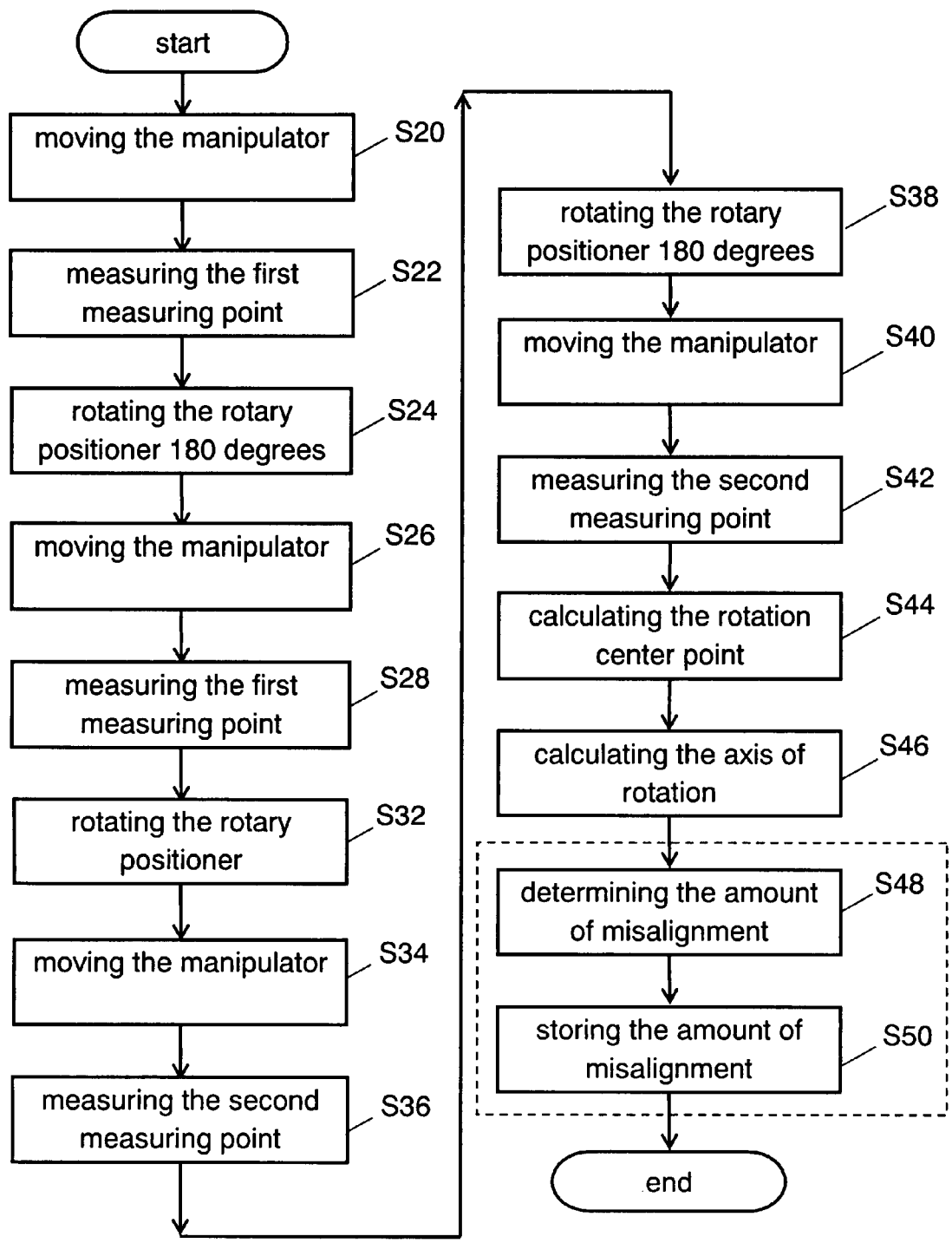
FIG. 5 is a flowchart showing the operation for calculating the rotation center points of the planes of rotation of the rotary positioner and the operation for calculating the axis of rotation connecting these rotation center points according to the second embodiment of the present invention.

The following is a description of the operation for calculating rotation center points 113 and 216 of planes of rotation 106 and 203 of rotary positioner 102, and the operation for calculating axis of rotation 217 connecting rotation center points 113 and 216 in robotic system 402 thus structured. FIG. 5 is a flowchart showing the operation for calculating the rotation center points of the planes of rotation of the rotary positioner and the operation for calculating the axis of rotation connecting these rotation center points according to the second embodiment of the present invention.

Although the present invention does not limit the sequence of the measurement, the present embodiment shows an example in which rotation center point 113 of plane of rotation 106 of rotary positioner 102 is measured first, and then rotation center point 216 of plane of rotation 203 facing plane of rotation 106 is measured.

First of all, rotation center point 113 of plane of rotation 106 of rotary positioner 102 is measured as follows.

In the same manner as in the first embodiment, rotation center point 113 is measured as follows as shown in FIG. 5. Plane of rotation 106 of rotary positioner 102 as the target to be measured is set to an arbitrary rotation angle, and the tip (end portion) of tool 105 is moved to a predetermined position on plane of rotation 106 of jig 218 which is rotated together with plane of rotation 106 of rotary positioner 102 by moving manipulator 101 (S20). The predetermined position is a corner point of jig 218 shown in FIG. 4 and referred to as a first measuring point.

The tip of tool 105 can be brought into contact with first measuring point 211 to calculate the position coordinate more accurately.

Motion controller 305 measures the coordinate of the tip position of tool 105 attached to manipulator 101 and stores it as the first location information to measuring point storage 302 in robot controller 301 (S22).

Then, plane of rotation 106 of rotary positioner 102 as the target to be measured is rotated 180 degrees (S24).

Motion controller 305 further moves the tip of tool 105 attached to manipulator 101 to first measuring point 212 that has been rotated (S26). Motion controller 305 then measures the tip position of tool 105 and stores it as second location information to measuring point storage 302 (S28).

In order to simplify the explanation, jig 218 shown in FIG. 4 is in the state before plane of rotation 106 of rotary positioner 102 is rotated 180 degrees (the state shown in Step S22) although jig 218 is actually in a different state after the 180 degree rotation.

The following is a description of measuring rotation center point 216 of plane of rotation 203, which is opposite to plane of rotation 106 of rotary positioner 102.

Similar to the measurement of rotation center point 113 of plane of rotation 106 of rotary positioner 102, plane of rotation 203 of rotary positioner 102 as the target to be measured is set to an arbitrary rotation angle (S32). This arbitrary rotation angle is not necessarily the same as the angle when first measuring points 211 and 212 are measured in Steps S22 and S28.

Then, manipulator 101 is moved to a corner point of jig 218, which is rotated together with plane of rotation 203. The corner point is on plane of rotation 203 and referred to as second measuring point 214 (S34).

Motion controller 305 measures the tip position of tool 105 attached to manipulator 201 (S36), and stores it as third location information to measuring point storage 302.

Next, plane of rotation 106 of rotary positioner 102 is rotated to rotate opposite plane of rotation 203 by 180 degrees (S38).

The tip of tool 105 is further moved to second measuring point 215 of plane of rotation 203 thus rotated (S40). Motion controller 305 measures the tip position of tool 105 (S42) and stores it as fourth location information to measuring point storage 302.

Correction amount calculator 303 in robot controller 301 calculates rotation center point 113 of plane of rotation 106 and rotation center point 216 of plane of rotation 203 as follows.

Correction amount calculator 303 first calculates a point bisecting the following straight line as rotation center point 113 of plane of rotation 106 of rotary positioner 102. The straight line connects the position coordinate (the first location information, or the position coordinate of first measuring point 211) of the tip position of tool 105 that has been measured and stored in measuring point storage 302 in Step S22 and the position coordinate (the second location information, or the position coordinate of first measuring point 212) of the tip position of tool 105 that has been measured and stored in measuring point storage 302 in Step S28. Correction amount calculator 303 then stores the location information of rotation center point 113 to correction amount storage 304.

Correction amount calculator 303 then calculates a point bisecting the following straight line as rotation center point 216 of plane of rotation 203. The straight line connects the position coordinate (the third location information, or the position coordinate of second measuring point 214) of the tip position of tool 105 that has been measured and stored in measuring point storage 302 in Step S36 and the position coordinate (the fourth location information, or the position coordinate of second measuring point 215) of the tip position of tool 105 that has been measured and stored in measuring point storage 302 in Step S42. Correction amount calculator 303 then stores the location information of rotation center point 216 to correction amount storage 304 (S44).

Next, working as an axis-of-rotation calculator, correction amount calculator 303 calculates the straight line connecting rotation center point 113 of plane of rotation 106 of rotary positioner 102 calculated in Step S44 and rotation center point 216 of plane of rotation 203. The straight line corresponds to the axis of rotation 217 of rotary positioner 102 (S46). The information showing the coordinate of axis of rotation 217 calculated by correction amount calculator 303 is stored in correction amount storage 304.

As described hereinbefore, robotic system 402 of the present embodiment calculates an axis of rotation more simply and more precisely than the conventional method by calculating rotation center points 113 and 216 of planes of rotation 106 and 203 disposed opposite to each other in the positioning device and then by connecting rotation center points 113 and 216 to form a straight line as the axis of rotation 217.

In the present embodiment, first measuring points 211 and 212, and second measuring points 214 and 215 are regarded as the corner points on plane of rotation 106 and plane of rotation 203, respectively. However, the present invention is not limited to this example. Regarding two different arbitrary points on jig 218 as the first measuring point and the second measuring point allows the calculation of the axis of rotation although it does not allow the calculation of the rotation center point of plane of rotation.

In the case where it is necessary to correct the motion of manipulator 101 of robotic system 402, as shown by the dotted-line square of FIG. 5, correction amount calculator 303 determines the amount of misalignment between rotation center point 113 of plane of rotation 106 of rotary positioner 102 that has been measured as above and the rotation center point of plane of rotation 106 that has been previously provided to robot controller 301 (S48). Correction amount calculator 303 then stores the amount of misalignment to correction amount storage 304 (S50). Correction amount calculator 303 also determines the amount of misalignment between rotation center point 216 of plane of rotation 203 measured as above and the rotation center point of plane of rotation 203 that has been previously provided to robot controller 301 (S48), and stores the amount of misalignment to correction amount storage 304 (S50). The information (amount of correction) stored in correction amount storage 304 can be used to correct the motion of manipulator 101 of robotic system 402. Such correction improves the precision of controlling robotic system 402.

In the example of the present embodiment, rotation center points 113 and 216 of planes of rotation 106 and 203 and axis of rotation 217 are determined by measuring the coordinates of the corner points of jig 218 attached to planes of rotation 106 and 203. However, the present invention is not limited to this example. Similar to the first embodiment, it is possible to provide a mark on each of planes of rotation 106 and 203 and to measure the position coordinates of the marks so as to determine the rotation center point of each plane of rotation.

Third Embodiment

Figure 6:
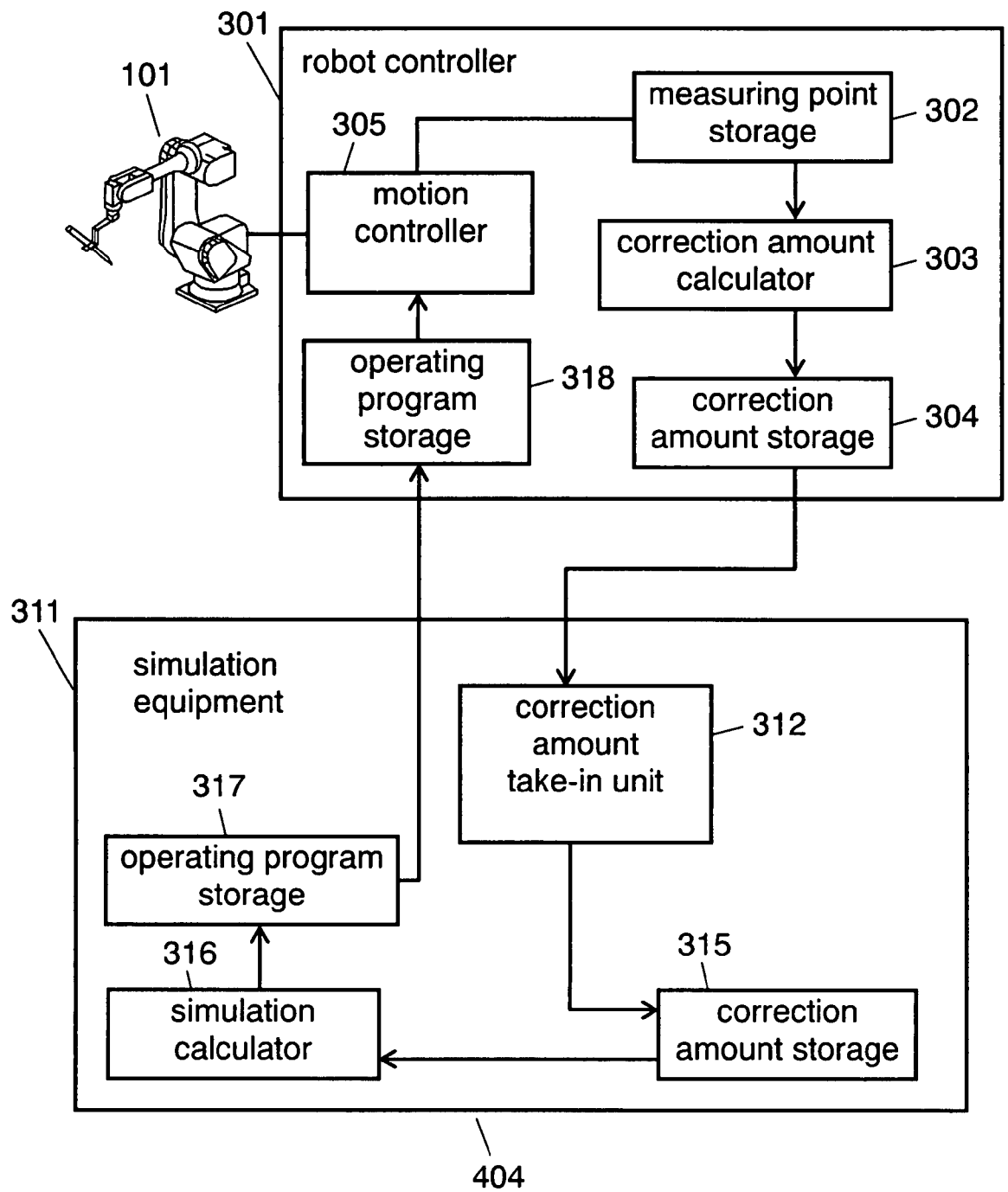
FIG. 6 shows the structure of a robotic system according to a third embodiment of the present invention.

A third embodiment of the present invention is described as follows with reference to FIG. 6. FIG. 6 shows the structure of robotic system 404 according to the third embodiment. In the present embodiment, the same components as those in the first and second embodiments will be referred to with the same numerals as those in the first and second embodiments and not described in detail again.

Robotic system 404 of the present embodiment differs from robotic system 400 of the first embodiment and robotic system 402 of the second embodiment in that the operating program of robotic system 404 can be corrected using simulation function based on the amount of correction calculated by the methods described in the first and second embodiments.

As shown in FIG. 6, robotic system 404 includes manipulator 101, robot controller 301, and simulation equipment 311, which generates an operating program to be used in robot controller 301 by simulation.

Robot controller 301 includes operating program storage 318 in addition to measuring point storage 302, correction amount calculator 303, correction amount storage 304, and motion controller 305 described in the first and second embodiments. Operating program storage 318 stores the operating program generated by simulation equipment 311.

Motion controller 305 controls the motion of manipulator 101 by executing the operating program stored in operating program storage 318.

Simulation equipment 311 is provided separately from robot controller 301 and includes correction amount take-in unit 312, correction amount storage 315, simulation calculator 316, and operating program storage 317. Correction amount take-in unit 312 takes in the amount of correction from robot controller 301. Correction amount storage 315 stores the amount of correction, which has been taken in by correction amount take-in unit 312. Simulation calculator 316 performs at least one of simulation calculation and off-line teaching in order to control at least one of manipulator 101 and rotary positioner 102 based on the amount of correction stored in correction amount storage 315. Operating program storage 317 stores the operating program, which has been generated as a result of the calculation by simulation calculator 316.

Simulation equipment 311 takes in the information (correction information) indicating the amount of correction stored in correction amount storage 304 of robot controller 301 via correction amount take-in unit 312, and stores it to correction amount storage 315. The correction information stored in correction amount storage 315 is taken in by simulation calculator 316, which performs at least one of robot motion simulation and off-line teaching In the present embodiment, simulation calculator 316 uses the correction information thus taken into simulation equipment 311 when performing simulation calculation. This makes it possible to correct the arrangement and inclination of the rotary positioner expressed on three-dimensional coordinates in simulation equipment 311, thereby reducing the inclination misalignment and position misalignment between the rotary positioner in virtual-reality world and the rotary positioner in the actual layout. Thus, the present embodiment enables simulation calculation and off-line teaching to be performed with high precision.

Then, simulation equipment 311 of robotic system 404 stores the operating program, which has been generated as a result of such simulation calculation or off-line teaching with high precision, to operating program storage 317. The control program prior to the correction can be transmitted from robot controller 301 to simulation equipment 311 so as to correct the operating program by simulation equipment 311. Alternatively, instead of transmitting the control program from robot controller 301, the operating program may be previously stored in simulation equipment 311 and corrected by it.

Robot controller 301 takes the control program of robotic system 404 stored in operating program storage 317 of simulation equipment 311 into operating program storage 318 of robot controller 301. Motion controller 305 in robot controller 301 reads and executes the control program stored in operating program storage 318, thereby controlling the motion of at least one of manipulator 101 and rotary positioner 102.

As described hereinbefore, in the present embodiment, manipulator 101 and rotary positioner 102 in the actual layout can be moved in accordance with the operating program that has undergone the simulation calculation and off-line teaching with high precision, thereby having higher operating precision.

Fourth Embodiment

Figure 7:
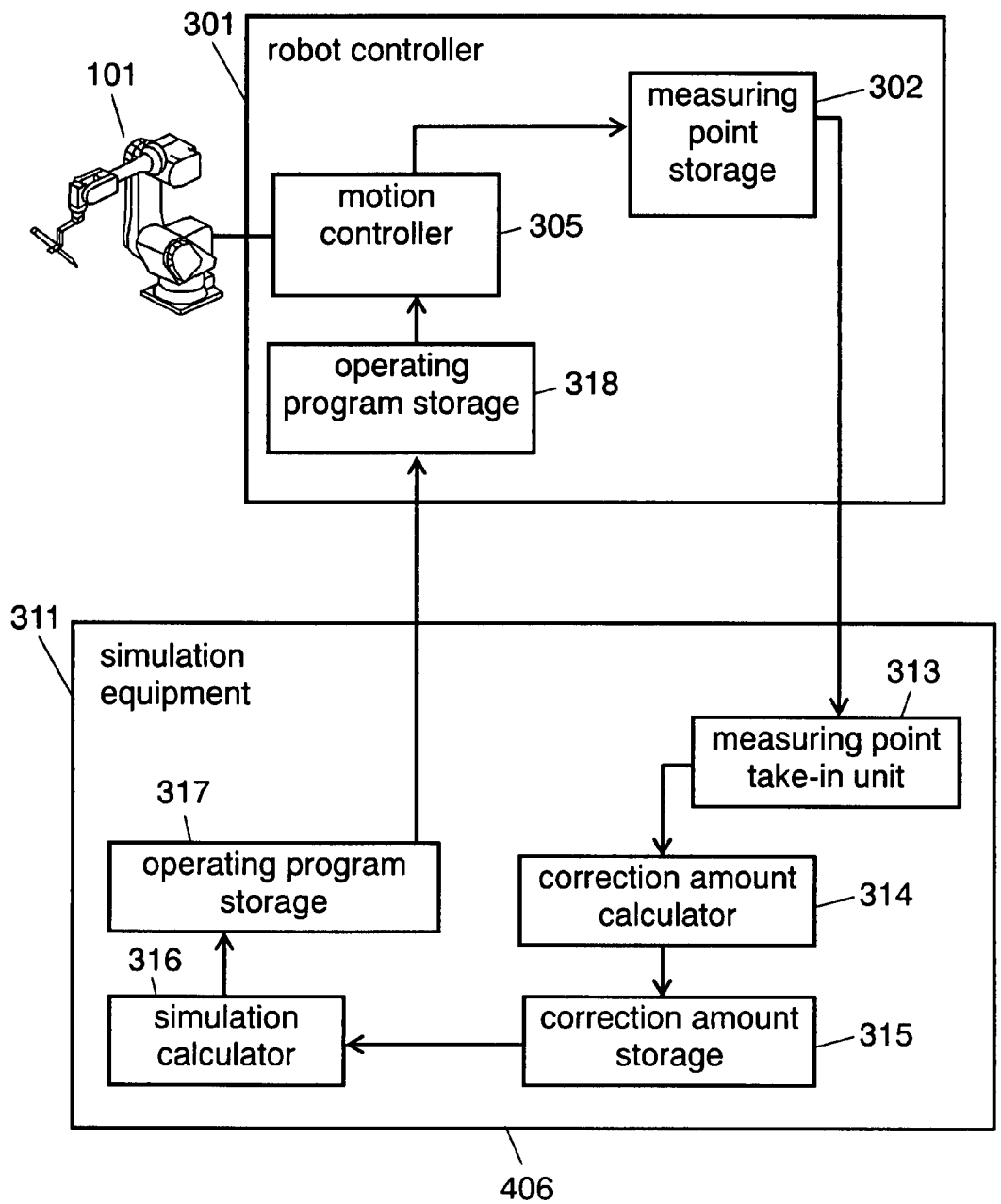
FIG. 7 shows the structure of a robotic system according to a fourth embodiment of the present invention.

A fourth embodiment of the present invention is described as follows with reference to FIG. 7. FIG. 7 shows the structure of robotic system 406 according to the fourth embodiment. In robotic system 406 of FIG. 7, the same components as those in robotic system 404 of the third embodiment will be referred to with the same numerals as those in the third embodiment and not described in detail again.

Robotic system 406 of the present embodiment differs from robotic system 404 of the third embodiment in that the amount of correction is calculated not in robot controller 301 but in simulation equipment 311.

As shown in FIG. 7, robotic system 406 includes manipulator 101, robot controller 301, and simulation equipment 311.

Robot controller 301 includes measuring point storage 302, motion controller 305, and operating program storage 318.

Simulation equipment 311 includes measuring point take-in unit 313, correction amount calculator 314, correction amount storage 315, simulation calculator 316, and operating program storage 317. Measuring point take-in unit 313 takes in the information about the measuring point measured in robot controller 301. The information indicates the measured results of the coordinates of mark 108, first and second measuring points 211 and 214, and the like. Correction amount calculator 314 calculates the rotation center point of a plane of rotation, the axis of rotation, and the like by using the information about the measuring point taken in by measuring point take-in unit 313. Correction amount storage 315 stores the calculation results of correction amount calculator 314. Simulation calculator 316 executes at least one of simulation calculation and off-line teaching in order to move at least one of manipulator 101 and rotary positioner 102, based on the information stored in correction amount storage 315. Operating program storage 317 stores the operating program generated as a result of the calculation by simulation calculator 316.

Simulation equipment 311 obtains the information about the measuring point from measuring point storage 302 in robot controller 301 via measuring point take-in unit 313. Correction amount calculator 314 calculates the correction information and stores the calculated correction information to correction amount storage 315.

Simulation calculator 316 performs simulation and off-line teaching by using the correction information, and stores the control program of at least one of manipulator 101 and rotary positioner 102 to operating program storage 317. Robot controller 301 takes in the operating program stored in operating program storage 317 so as to control manipulator 101 and the like.

As described hereinbefore, in the present embodiment, robot controller 301 does not have the function of calculating the amount of correction, but simulation equipment 311 is provided with this function. This enables manipulator 101 and rotary positioner 102 in the actual layout to be moved based on the operating program that has undergone simulation or off-line teaching with high precision, thereby having higher operating precision.

Fifth Embodiment

Figure 8:
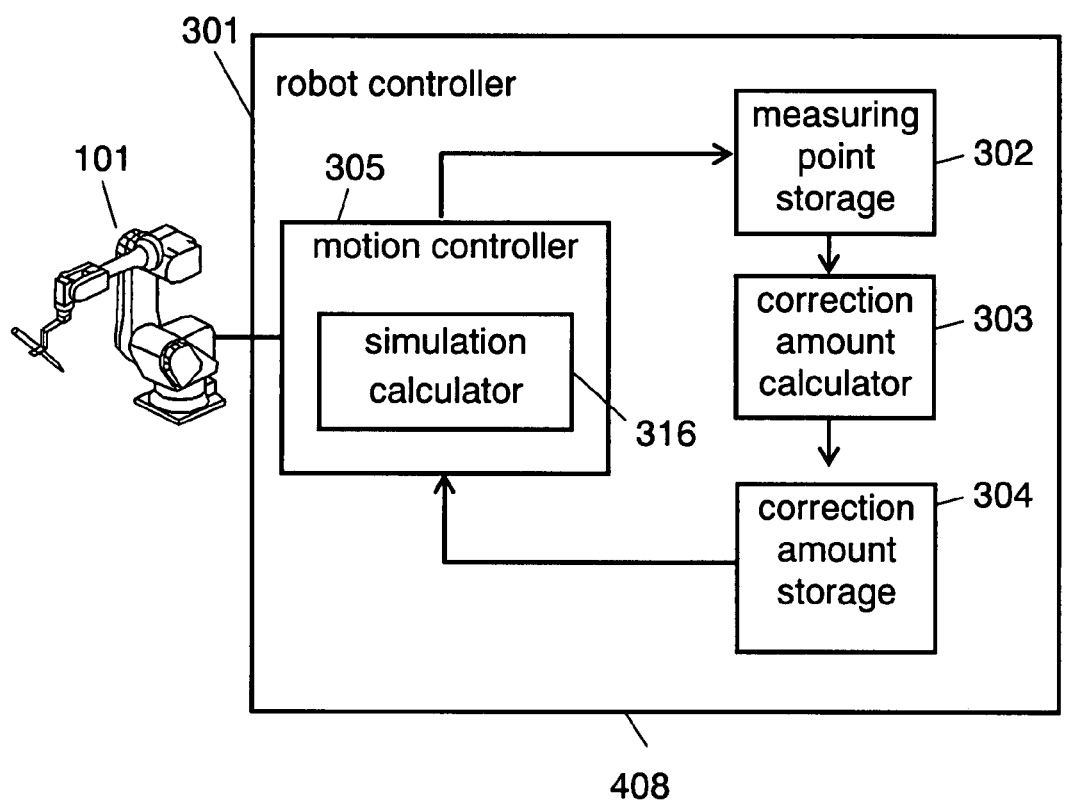
FIG. 8 shows the structure of a robotic system according to a fifth embodiment of the present invention.

A fifth embodiment of the present invention is described as follows with reference to FIG. 8. FIG. 8 shows the structure of robotic system 408 according to the fifth embodiment.

In FIG. 8, the same components as those in the third and fourth embodiments will be referred to with the same numerals as those in the third and fourth embodiments and not described in detail again.

Robotic system 408 of the present embodiment differs from robotic system 404 of the third embodiment in that (i) robotic system 408 does not have simulation equipment 311, (ii) simulation calculator 316 is provided in robot controller 301, and (iii) at least one of manipulator 101 and rotary positioner 102 is controlled in robot controller 301 by performing simulation and teaching using the correction information.

The present embodiment is identical to the third embodiment in that in robot controller 301, the correction information is calculated by correction amount calculator 303 based on the information stored in measuring point storage 302, and then stored in correction amount storage 304.

Motion controller 305 includes simulation calculator 316. Simulation calculator 316 can correct the arrangement and inclination of the rotary positioner in the virtual-reality world, which are expressed for example on three-dimensional coordinates, by the correction information. Robotic system 408 performs simulation and off-line teaching with high precision by reducing the position misalignment and inclination misalignment between the rotary positioner in virtual-reality world and the rotary positioner in the actual layout.

As described hereinbefore, in the present embodiment, robot controller 301 has the simulation function, making it possible to perform simulation and off-line teaching with high precision without providing simulation equipment 311 separate from robot controller 301. This allows high-precision motion of manipulator 101, and the like.

As described hereinbefore, the present invention has the effect of calculating the rotation center point of a rotor or the axis of rotation connecting the rotation center points of two rotors without using an external device such as a photographic device. This make the present invention useful as a method for calculating at least one of the rotation center point of a rotor and the axis of rotation connecting the rotation center points of two rotors by using a manipulator.

The invention claimed is:

1. A method for calculating a rotation center point on a plane of rotation of a positioning device by using a manipulator, the positioning device positioning a workpiece by rotating the plane of rotation, the method comprising:
    setting a mark on a predetermined position on the plane of rotation;
    obtaining first location information of the mark by using the manipulator, such that the first location information is obtained based on a first tip position of a tip of a tool that is for processing the workpiece and that is held by the manipulator,
    rotating the plane of rotation of the positioning device 180 degrees;
    obtaining second location information of the mark on the 180-degree rotated plane of rotation by using the manipulator, such that the second location information is obtained based on a second tip position of the tip of the tool of the manipulator; and
    calculating a point bisecting a straight line, as the rotation center point on the plane of rotation of the positioning device, the point being calculated based on the first location information and the second location information, the straight line connecting the position of the mark on the plane of rotation prior to the rotating of the plane of rotation and the position of the mark on the 180-degree rotated plane of rotation.

2. A method for generating a program for moving at least one of a manipulator holding a tool for processing a workpiece and a positioning device, the positioning device positioning the workpiece by rotating a plane of rotation of the positioning device, the method comprising;
    comparing first center point location information, which indicates a rotation center point on the plane of rotation of the positioning device, contained in the program with second center point location information, which indicates the rotation center point on the plane of rotation of the positioning device, calculated according to the method for calculating the rotation center point of claim 1; and
    generating a new operating program by correcting the program based on a result of the comparing of the first center point location information and the second center point location information.

3. A method for calculating an axis of rotation connecting a first rotation center point on a first plane of rotation of a positioning device and a second rotation center point on a second plane of rotation of the positioning device by using a manipulator, the positioning device positioning a workpiece by rotating the first plane of rotation and the second plane of rotation, the first plane of rotation and the second plane of rotation being disposed to oppose one another, the method comprising:
    obtaining first location information of a first measuring point on the first plane of rotation by using the manipulator, such that the first location information is obtained based on a first tip position of a tip of a tool that is for processing the workpiece and that is held by the manipulator;
    rotating the first plane of rotation of the positioning device 180 degrees;
    obtaining second location information of the first measuring point on the 180-degree rotated first plane of rotation by using the manipulator, such that the second location information is obtained based on a second tip position of the tip of the tool of the manipulator;
    calculating a first point bisecting a first straight line, as the first rotation center point on the first plane of rotation, the first point being calculated based on the first location information and the second location information, the first straight line connecting the first measuring point on the first plane of rotation prior to the rotating of the first plane of rotation and the first measuring point on the 180-degree rotated first plane of rotation;
    obtaining third location information of a second measuring point on the second plane of rotation by using the manipulator, such that the third location information is obtained based on a third tip position of the tip of the tool of the manipulator;
    rotating the second plane of rotation of the positioning device 180 degrees;
    obtaining fourth location information of the second measuring point on the 180-degree rotated second plane of rotation by using the manipulator, such that the fourth location information is obtained based on a fourth tip position of the tip of the tool of the manipulator;
    calculating a second point bisecting a second straight line, as the second rotation center point on the second plane of rotation, the second point being calculated based on the third location information and the fourth location information, the second straight line connecting the second measuring point on the second plane of rotation prior to the rotating of the second plane of rotation and the second measuring point on the 180-degree rotated second plane of rotation; and
    calculating the axis of rotation connecting the calculated first rotation center point on the first plane of rotation and the calculated second rotation center point on the second plane of rotation.

4. A robotic system for calculating a rotation center point on a plane of rotation of a positioning device, the positioning device positioning a workpiece by rotating the plane of rotation, the robotic system comprising:

a manipulator holding a tool for processing the workpiece;

a motion controller for (i) obtaining first location information of a mark set on the plane of rotation by using the manipulator, such that the first location information is obtained based on a first tip position of a tip of the tool held by the manipulator, (ii) rotating the plane of rotation of the positioning device 180 degrees, and (iii) obtaining second location information of the mark on the 180-degree rotated plane of rotation by using the manipulator, such that the second location information is obtained based on a second tip position of the tip of the tool held by the manipulator; and a rotation center point calculator for calculating a position bisecting a straight line, as the rotation center point on the plane of rotation of the positioning device, the point being calculated based on the first location information and the second location information, the straight line connecting the mark on the plane of rotation prior to the rotating of the plane of rotation and the mark on the 180-degree rotated plane of rotation.

5. The robotic system of claim 4 further comprising a simulation calculator, the simulation calculator performing at least one of simulation calculation and off-line teaching, based on a position coordinate of the rotation center point on the plane of rotation of the positioning device, the position coordinate having been calculated by the rotation center point calculator.

6. The robotic system of claim 5 comprising:
a robot controller including the motion controller; and
simulation equipment including the simulation calculator.

7. The robotic system of claim 6, wherein
the robot controller includes the rotation center point calculator.

8. The robotic system of claim 6, wherein
the simulation equipment includes the rotation center point calculator.

9. A robotic system for calculating an axis of rotation connecting a first rotation center point on a first plane of rotation of a positioning device and a second rotation center point on a second plane of rotation of the positioning device, the positioning device positioning a workpiece by rotating the first plane of rotation and the second plane of rotation, the first plane of rotation and the second plane of rotation being disposed to oppose one another, the robotic system comprising:

a manipulator holding a tool for processing the workpiece;

a motion controller for (i) obtaining first location information of a first measuring point on the first plane of rotation by using the manipulator, such that the first location information is obtained based on a first tip position of a tip of the tool held by the manipulator, (ii) rotating the first plane of rotation of the positioning device 180 degrees, (iii) obtaining second location information of the first measuring point on the 180-degree rotated first plane of rotation by using the manipulator, such that, the second location information is obtained based on a second tip position of the tip of the tool held by the manipulator, (iv) obtaining third location information of a second measuring point on the second plane of rotation by using the manipulator, such that the third location information is obtained based on a third tip position of the tip of the tool held by the manipulator, (v) rotating the second plane of rotation of the positioning device 180 degrees, and (vi) obtaining fourth location information of the second measuring point on the 180-degree rotated second plane of rotation by using the manipulator, such that the fourth location information is obtained based on a fourth tip position of the tip of the tool of the manipulator; and an axis-of-rotation calculator for calculating:
a first point bisecting a first straight line, as the first rotation center point on the first plane of rotation, the first point being calculated based on the first location information and the second location information, the first straight line connecting the first measuring point on the first plane of rotation prior to the rotating of the first plane of rotation and the first measuring point on the 180-degree rotated first plane of rotation;

a second point bisecting a second straight line, as the second rotation center point on the second plane of rotation, the second point being calculated based on the third location information and the fourth location information, the second straight line connecting the second measuring point on the second plane of rotation prior to the rotating of the second plane of rotation and the second measuring point on the 180-degree rotated second plane of rotation; and the axis of rotation connecting the calculated first rotation center point on the first plane of rotation and the calculated second rotation center point on the second plane of rotation.

* * * * *